US009534111B2

(12) United States Patent
Kuwahara et al.

(10) Patent No.: US 9,534,111 B2
(45) Date of Patent: *Jan. 3, 2017

(54) RUBBER COMPOSITION AND TIRE

(71) Applicants: KURARAY CO., LTD., Kurashiki-shi (JP); AMYRIS, Inc., Emeryville, CA (US)

(72) Inventors: Shigenao Kuwahara, Kamisu (JP); Kei Hirata, Kamisu (JP); Daisuke Koda, Kamisu (JP)

(73) Assignees: KURARAY CO., LTD., Karashiki-shi (JP); AMYRIS, INC., Emeryville, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/537,156

(22) Filed: Nov. 10, 2014

(65) Prior Publication Data

US 2015/0065636 A1    Mar. 5, 2015

Related U.S. Application Data

(63) Continuation of application No. 14/125,461, filed as application No. PCT/JP2012/074168 on Sep. 21, 2012, now Pat. No. 8,912,269.

(30) Foreign Application Priority Data

Sep. 30, 2011 (JP) ................................. 2011-218119
Feb. 24, 2012 (JP) ................................. 2012-039412

(51) Int. Cl.
| *C08L 9/06* | (2006.01) |
| *B60C 1/00* | (2006.01) |
| *C08F 136/22* | (2006.01) |
| *C08L 47/00* | (2006.01) |
| *C08L 21/00* | (2006.01) |
| *C08L 7/00* | (2006.01) |

(52) U.S. Cl.
CPC . *C08L 9/06* (2013.01); *B60C 1/00* (2013.01); *C08F 136/22* (2013.01); *C08L 7/00* (2013.01); *C08L 21/00* (2013.01); *C08L 47/00* (2013.01)

(58) Field of Classification Search
CPC ............ C08L 7/00; C08L 21/00; C08L 47/00; C08L 9/06; B60C 1/00; C08F 136/22; C08K 3/04

USPC ........................................ 524/496, 500, 570
See application file for complete search history.

(56) References Cited

U.S. PATENT DOCUMENTS

| 5,744,547 | A | 4/1998 | Moritani et al. | |
| 6,220,323 | B1* | 4/2001 | Sandstrom et al. | ........ 152/209.5 |
| 7,655,739 | B1 | 2/2010 | McPhee et al. | |
| 7,884,154 | B2 | 2/2011 | Okamoto et al. | |
| 8,785,542 | B2 | 7/2014 | Kuwahara et al. | |
| 2006/0167160 | A1* | 7/2006 | Nakagawa et al. | ........... 524/442 |
| 2009/0239976 | A1 | 9/2009 | Gardi et al. | |
| 2010/0056714 | A1 | 3/2010 | McPhee | |
| 2010/0056743 | A1* | 3/2010 | McPhee | ........................ 526/346 |

FOREIGN PATENT DOCUMENTS

| CN | 101885862 A | 11/2010 |
| JP | 9 71620 | 3/1997 |
| JP | 10 81807 | 3/1998 |
| JP | 2004 91742 | 3/2004 |
| JP | 2009 536678 | 10/2009 |
| JP | 2010 209256 | 9/2010 |
| JP | 2011 195804 | 10/2011 |
| TW | 200624442 | 7/2006 |
| TW | 201026773 A1 | 7/2010 |
| WO | 2010 027463 | 3/2010 |
| WO | 2010 027464 | 3/2010 |

OTHER PUBLICATIONS

Combined Chinese Office Action and Search Report issued Aug. 7, 2014 in Patent Application No. 201280039788.6 (with English translation of categories of cited documents).
Taiwanese Office Action issued Apr. 29, 2014, in Taiwan Patent Application No. 101134698.
International Search Report issued Dec. 18, 2012 in PCT/JP12/074168 filed Sep. 21, 2012.

* cited by examiner

*Primary Examiner* — Alexander Kollias
(74) *Attorney, Agent, or Firm* — Oblon, McClelland, Maier & Neustadt, L.L.P.

(57) ABSTRACT

The present invention relates to a rubber composition including (A) at least one rubber component selected from the group consisting of a synthetic rubber and a natural rubber; (B) a polymer of farnesene; and (C) carbon black having an average particle size of from 5 to 100 nm, a content of the carbon black (C) in the rubber composition being from 20 to 100 parts by mass on the basis of 100 parts by mass of the rubber component (A).

11 Claims, No Drawings

RUBBER COMPOSITION AND TIRE

CROSS REFERENCE TO RELATED APPLICATIONS

The present application is a continuation of U.S. patent application Ser. No. 14/125,461, filed on Dec. 11, 2013, which is a 35 U.S.C. §371 national stage patent application of international patent application PCT/JP2012/074168, filed on Sep. 21, 2012, the text of which is incorporated by reference, and claims the benefit of the filing date of Japanese application no. JP 2012-039412, filed on Feb. 24, 2012, and JP 2011-218119, filed on Sep. 30, 2011, the texts which are also incorporated by reference.

TECHNICAL FIELD

The present invention relates to a rubber composition containing a rubber component, a polymer of farnesene and carbon black, and a tire using the rubber composition.

BACKGROUND ART

Hitherto, in the application field of tires for which a wear resistance and a mechanical strength are required, there have been extensively used rubber compositions that are enhanced in mechanical strength by incorporating a reinforcing agent such as carbon black in a rubber component such as a natural rubber and a styrene-butadiene rubber.

It is known that the carbon black exhibits its reinforcing effect by physically or chemically adsorbing the aforementioned rubber component onto a surface of respective particles of the carbon black.

However, when the particle size of the carbon black used in the rubber composition is as large as from about 100 to about 200 nm, it is generally difficult to attain a sufficient interaction between the carbon black and the rubber component, so that the resulting rubber composition tends to be hardly improved in mechanical strength to a sufficient extent.

In addition, tires produced from such a rubber composition tend to exhibit a low hardness and therefore tend to be insufficient in steering stability.

On the other hand, when the carbon black used in the rubber composition has an average particle size as small as from about 5 to about 100 nm and therefore a large specific surface area, the resulting rubber composition can be improved in properties such as mechanical strength and wear resistance owing to a large interaction between the carbon black and the rubber component.

In addition, tires produced from such a rubber composition can be improved in steering stability owing to an increased hardness thereof.

However, in the case where the carbon black having such a small average particle size is used in the rubber composition, it is known that the resulting rubber composition tends to be deteriorated in dispersibility of the carbon black therein owing to a high cohesive force between the carbon black particles.

The deteriorated dispersibility of the carbon black in the rubber composition tends to induce a prolonged kneading step and therefore tends to give an adverse influence on productivity of the rubber composition.

Also, the deteriorated dispersibility of the carbon black tends to cause generation of heat in the rubber composition, so that tires produced therefrom tend to be deteriorated in rolling resistance performance and may frequently fail to satisfy the requirements for low rolling resistance tires (so-called low-fuel consumption tires).

Further, in the case where the carbon black used in the rubber composition has a small average particle size, there tends to occur such a problem that the resulting rubber composition exhibits a high viscosity and therefore is deteriorated in processability.

Thus, the mechanical strength and hardness of the rubber composition for tires are properties having a contradictory relation with the rolling resistance performance and processability thereof, and it is therefore considered that the rubber composition is hardly improved in both of the properties in a well-balanced manner.

In Patent Document 1, as a rubber composition that can be improved in the aforementioned properties in a well-balanced manner, there is described the rubber composition for tires which includes a rubber component containing an isoprene-based rubber and a styrene-butadiene rubber, carbon black and a liquid resin having a softening point of from −20 to 20° C. at a specific compounding ratio.

Also, Patent Document 2 describes the tire including a rubber component containing a diene-based rubber constituted of a modified styrene-butadiene copolymer and a modified conjugated diene-based polymer, and a filler such as carbon black at a specific compounding ratio.

However, any of the tires described in these Patent Documents fail to satisfy the mechanical strength and hardness as well as the rolling resistance performance and processability with a sufficiently high level, and therefore there is still a strong demand for tires that are further improved in these properties.

Meanwhile, Patent Documents 3 and 4 describe a polymer of β-farnesene, but fail to have a sufficient study on practical applications thereof.

CITATION LIST

Patent Literature

Patent Document 1: JP 2011-195804A
Patent Document 2: JP 2010-209256A
Patent Document 3: WO 2010/027463A
Patent Document 4: WO 2010/027464A

SUMMARY OF INVENTION

Technical Problem

The present invention has been made in view of the above conventional problems. The present invention provides a rubber composition that exhibits not only a good processability upon compounding, molding or curing, but also an excellent rolling resistance performance owing to an improved dispersibility of carbon black therein, and further hardly suffers from deterioration in mechanical strength and hardness, and a tire obtained using the rubber composition.

Solution to Problem

As a result of extensive and intensive researches, the present inventors have found that when using a conjugated diene-based polymer having a specific structure, the resulting rubber composition can be improved in processability, can exhibit a low rolling resistance owing to an improved dispersibility of carbon black therein, and further hardly suffers from deterioration in mechanical strength and hardness. The present invention has been accomplished on the basis of the above finding.

That is, the present invention relates to the following aspects.

[1] A rubber composition including (A) at least one rubber component selected from the group consisting of a synthetic rubber and a natural rubber; (B) a polymer of farnesene; and (C) carbon black having an average particle size of from 5 to 100 nm, a content of the carbon black (C) in the rubber composition being from 20 to 100 parts by mass on the basis of 100 parts by mass of the rubber component (A), and

[2] A tire at least partially including the above rubber composition.

Advantageous Effects of Invention

According to the present invention, there are provided a rubber composition that has not only a good processability upon compounding, molding or curing, but also an excellent rolling resistance performance owing to an improved dispersibility of carbon black therein, and further hardly suffers from deterioration in mechanical strength and hardness, and a tire obtained using the rubber composition.

DESCRIPTION OF EMBODIMENTS

[Rubber Composition]

The rubber composition of the present invention includes (A) at least one rubber component selected from the group consisting of a synthetic rubber and a natural rubber; (B) a polymer of farnesene; and (C) carbon black having an average particle size of from 5 to 100 nm, in which a content of the carbon black (C) in the rubber composition is from 20 to 100 parts by mass on the basis of 100 parts by mass of the rubber component (A).

<Rubber Component (A)>

(1) Synthetic Rubber

Examples of the synthetic rubber used herein include a styrene-butadiene rubber (hereinafter occasionally referred to merely as "SBR"), an isoprene rubber, a butadiene rubber, a butyl rubber, a halogenated butyl rubber, an ethylene propylene diene rubber, a butadiene acrylonitrile copolymer rubber and a chloroprene rubber. Among these synthetic rubbers, preferred are SBR, an isoprene rubber and a butadiene rubber. These synthetic rubbers may be used alone or in combination of any two or more thereof.

(SBR (A-1))

As SBR (A-1), there may be used those generally used in the applications of tires. More specifically, the SBR (A-1) preferably has a styrene content of from 0.1 to 70% by mass and more preferably from 5 to 50% by mass. Also, the SBR (A-1) preferably has a vinyl content of from 0.1 to 60% by mass and more preferably from 0.1 to 55% by mass.

The weight-average molecular weight (Mw) of the SBR (A-1) is preferably from 100,000 to 2,500,000, more preferably from 150,000 to 2,000,000 and still more preferably from 200,000 to 1,500,000. When the weight-average molecular weight of the SBR (A-1) falls within the above-specified range, the resulting rubber composition can be enhanced in both processability and mechanical strength. Meanwhile, in the present specification, the weight-average molecular weight is the value measured by the method described below in Examples.

The glass transition temperature (Tg) of the SBR used in the present invention as measured by differential thermal analysis is preferably from $-95°$ C. to $0°$ C. and more preferably from $-95°$ C. to $-5°$ C. When adjusting Tg of the SBR to the above-specified range, it is possible to suppress increase in viscosity of the SBR and enhance a handling property thereof.

<<Method for Producing SBR (A-1)>>

The SBR (A-1) usable in the present invention may be produced by copolymerizing styrene and butadiene. The production method of the SBR is not particularly limited, and the SBR may be produced by any of an emulsion polymerization method, a solution polymerization method, a vapor phase polymerization method and a bulk polymerization method. Among these polymerization methods, especially preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying agent and then subjected to emulsion polymerization using a radical polymerization initiator.

As the emulsifying agent, there may be used a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent gives any adverse influence on stability of the polymerization.

Examples of the radical polymerization initiator include persulfates such as ammonium persulfate and potassium persulfate, organic peroxides and hydrogen peroxide.

In order to suitably adjust a molecular weight of the obtained E-SBR, there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, $\gamma$-terpinene and an $\alpha$-methyl styrene dimer.

The temperature used upon the emulsion polymerization may be appropriately determined according to the kind of radical polymerization initiator used therein, and is usually preferably from 0 to $100°$ C. and more preferably from 0 to $60°$ C. The polymerization method may be either a continuous polymerization method or a batch polymerization method. The polymerization reaction may be stopped by adding a terminating agent to the reaction system.

Examples of the terminating agent include amine compounds such as isopropyl hydroxylamine, diethyl hydroxylamine and hydroxylamine; quinone-based compounds such as hydroquinone and benzoquinone; and sodium nitrite.

After terminating the polymerization reaction, an antioxidant may be added, if required. Further, after stopping the polymerization reaction, unreacted monomers may be removed from the resulting latex, if required. Thereafter, the obtained polymer is coagulated by adding a salt such as sodium chloride, calcium chloride and potassium chloride as a coagulant thereto, and, if required, while adjusting a pH value of the coagulation system by adding an acid such as nitric acid and sulfuric acid thereto, and then the dispersing solvent is separated from the reaction solution to recover the polymer as a crumb. The thus recovered crumb is washed with water and dehydrated, and then dried using a band dryer or the like to obtain E-SBR.

Meanwhile, upon coagulating the polymer, the latex may be previously mixed with an extender oil in the form of an emulsified dispersion to recover the polymer in the form of an oil-extended rubber.

(ii) Solution-Polymerized Styrene-Butadiene Rubber (S-SBR)

S-SBR may be produced by an ordinary solution polymerization method. For example, styrene and butadiene are polymerized in a solvent using an anion-polymerizable active metal, if required, in the presence of a polar compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents may be usually used in such a range that a monomer is dissolved therein at a concentration of from 1 to 50% by mass.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may be used in the form of an organic alkali metal amide by allowing a secondary amine such as dibutyl amine, dihexyl amine and dibenzyl amine to react therewith.

The polar compound used in the solution polymerization is not particularly limited as long as the compound do not cause deactivation of the reaction and can be ordinarily used for controlling a microstructure of butadiene moieties and distribution of styrene in a copolymer chain thereof. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature used in the above polymerization reaction is usually from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to a reaction solution in a continuous or intermittent manner such that a compositional ratio between the styrene and butadiene in the polymerization system falls within a specific range.

The polymerization reaction may be stopped by adding an alcohol such as methanol and isopropanol as a terminating agent to the reaction system. In addition, before adding the terminating agent, there may be added a coupling agent such as tin tetrachloride, tetrachlorosilane, tetramethoxysilane, tetraglycidyl-1,3-bisaminomethyl cyclohexane and 2,4-tolylene diisocyanate which are capable of reacting with an active end of the polymer chain, and a chain end-modifying agent such as 4,4'-bis(diethylamino)benzophenone and N-vinyl pyrrolidone. The polymerization reaction solution obtained after terminating the polymerization reaction may be directly subjected to drying or steam stripping to remove the solvent therefrom, thereby recovering the S-SBR as aimed. Meanwhile, before removing the solvent, the polymerization reaction solution may be previously mixed with an extender oil to recover the S-SBR in the form of an oil-extended rubber.

[Modified Styrene-Butadiene Rubber (Modified SBR)]

In the present invention, there may also be used a modified SBR produced by introducing a functional group into SBR. Examples of the functional group to be introduced include an amino group, an alkoxysilyl group, a hydroxyl group, an epoxy group and a carboxyl group.

In the modified SBR, the site of the polymer into which the functional group is introduced may be either a chain end or a side chain of the polymer.

(Isoprene Rubber (A-2))

The isoprene rubber may be a commercially available isoprene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these isoprene rubbers, preferred are isoprene rubbers obtained by the polymerization using the Ziegler-based catalyst because of a high cis isomer content thereof. In addition, there may also be used those isoprene rubbers having an ultrahigh cis isomer content which are produced using the lanthanoid-based rare earth metal catalyst.

The isoprene rubber has a vinyl content of 50% by mass or less, preferably 40% by mass or less, and more preferably 30% by mass or less. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably −20° C. or lower and more preferably −30° C. or lower.

The weight-average molecular weight of the isoprene rubber is preferably from 90,000 to 2,000,000 and more preferably from 150,000 to 1,500,000. When the weight-average molecular weight of the isoprene rubber falls within the above-specified range, the resulting rubber composition can exhibit a good processability and a good mechanical strength.

The isoprene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

(Butadiene Rubber (A-3))

The butadiene rubber may be a commercially available butadiene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these butadiene rubbers, preferred are butadiene rubbers obtained by the polymerization using the Ziegler-based catalyst because of a high cis isomer content thereof. In addition, there may also be used those butadiene rubbers having an ultrahigh cis isomer content which are produced using the lanthanoid-based rare earth metal catalyst.

The butadiene rubber has a vinyl content of 50% by mass or less, preferably 40% by mass or less, and more preferably 30% by mass or less. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably −40° C. or lower and more preferably −50° C. or lower.

The weight-average molecular weight of the butadiene rubber is preferably from 90,000 to 2,000,000 and more preferably from 150,000 to 1,500,000. When the weight-average molecular weight of the butadiene rubber falls within the above-specified range, the resulting rubber composition can exhibit a good processability and a good mechanical strength.

The butadiene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

As the rubber component other than the SBR, the isoprene rubber and the butadiene rubber, there may be used one or more rubbers selected from the group consisting of a butyl rubber, a halogenated butyl rubber, an ethylene-propylene rubber, a butadiene-acrylonitrile copolymer rubber and a chloroprene rubber. The method of producing these rubbers is not particularly limited, and any suitable commercially available rubbers may also be used in the present invention.

In the present invention, when using the SBR, the isoprene rubber, the butadiene rubber and the other synthetic rubber in combination with the below-mentioned polymer (B) of farnesene, it is possible to improve a processability of the resulting rubber composition, a dispersibility of carbon black therein and a rolling resistance performance thereof.

When using a mixture of two or more kinds of synthetic rubbers, the combination of the synthetic rubbers may be optionally selected unless the effects of the present invention are adversely influenced. Also, various properties of the resulting rubber composition such as a rolling resistance performance and a wear resistance may be appropriately controlled by selecting a suitable combination of the synthetic rubbers.

(2) Natural Rubber

Examples of the natural rubber include TSR such as SMR, SIR and STR; natural rubbers ordinarily used in tire industries, such as RSS; high-purity natural rubbers; and modified natural rubbers such as epoxidized natural rubbers, hydroxylated natural rubbers, hydrogenated natural rubbers and grafted natural rubbers. Among these natural rubbers, SMR20, STR20 and RSS#3 are preferred from the viewpoints of a less variation in quality and a good availability. These natural rubbers may be used alone or in combination of any two or more thereof.

The rubber component (A) includes at least one rubber selected from the group consisting of a synthetic rubber and a natural rubber. When using both of the synthetic rubber and the natural rubber, the compounding ratio between the synthetic rubber and the natural rubber may be optionally determined.

<Polymer (B) of Farnesene>

The rubber composition of the present invention contains a polymer (B) of farnesene (hereinafter referred to merely as the "polymer (B)"). The polymer (B) may be produced, for example, by polymerizing β-farnesene represented by the following formula (I) by the below-mentioned method.

The polymer of farnesene used in the present invention may be either a polymer of α-farnesene or a polymer of β-farnesene represented by the following formula (I). From the viewpoint of easiness of production of the polymer, preferred is the polymer of β-farnesene.

Meanwhile, in the present specification, the polymer of farnesene means a polymer containing a constitutional unit derived from farnesene in an amount of preferably 90% by mass or more, more preferably 95% by mass or more, still more preferably 98% by mass or more, further still more preferably 99% by mass or more, and most preferably 100% by mass. The polymer of farnesene may also contain a constitutional unit derived from the other monomers such as butadiene and isoprene.

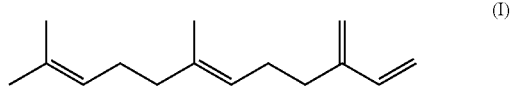

(I)

The weight-average molecular weight of the polymer (B) is preferably 25,000 or more, more preferably 30,000 or more, still more preferably 35,000 or more and further still more preferably 40,000 or more, and also is preferably 500,000 or less, more preferably 450,000 or less, still more preferably 400,000 or less and further still more preferably 300,000 or less. More specifically, the weight-average molecular weight of the polymer (B) is preferably from 25,000 to 500,000, more preferably from 30,000 to 450,000, still more preferably from 35,000 to 400,000, and further still more preferably from 40,000 to 300,000.

When the weight-average molecular weight of the polymer (B) falls within the above-specified range, the resulting rubber composition according to the present invention has a good processability, and further can be improved in dispersibility of the carbon black (C) therein and therefore can exhibit a good rolling resistance performance. Meanwhile, the weight-average molecular weight of the polymer (B) used in the present specification is the value measured by the below-mentioned method. In the present invention, two or more kinds of polymers (B) that are different in weight-average molecular weight from each other may be used in the form of a mixture thereof.

The melt viscosity (as measured at 38° C.) of the polymer (B) is preferably from 0.1 to 3,000 Pa·s, more preferably from 0.6 to 2,800 Pa·s, still more preferably from 1.5 to 2,600 Pa·s and most preferably from 1.5 to 800 Pa·s. When the melt viscosity of the polymer (B) falls within the above-specified range, the resulting rubber composition can be easily kneaded and can be improved in processability. Meanwhile, in the present specification, the melt viscosity of the polymer (B) is the value measured by the method described below in Examples.

The molecular weight distribution (Mw/Mn) of the polymer (B) is preferably from 1.0 to 8.0, more preferably from 1.0 to 5.0 and still more preferably from 1.0 to 3.0. When the molecular weight distribution (Mw/Mn) of the polymer (B) falls within the above-specified range, the resulting polymer (B) can suitably exhibit a less variation in viscosity thereof.

The glass transition temperature of the polymer (B) may vary depending upon a vinyl content or the other monomer content thereof, and is preferably from −90 to 0° C. and more preferably from −90 to −10° C. When the glass transition temperature of the polymer (B) falls within the above-specified range, the resulting rubber composition can exhibit a good rolling resistance performance. The vinyl content of the polymer (B) is preferably 99% by mass or less and more preferably 90% by mass or less.

In the present invention, the polymer (B) is preferably compounded in an amount of from 0.1 to 100 parts by mass, more preferably from 0.5 to 50 parts by mass and still more preferably from 1 to 30 parts by mass on the basis of 100 parts by mass of the rubber component (A). When the amount of the polymer (B) compounded falls within the above-specified range, the resulting rubber composition can exhibit good processability, mechanical strength and rolling resistance performance.

Meanwhile, in the case where the carbon black (C) has an average particle size of 60 nm or less, the polymer (B) is preferably compounded in an amount of from 0.1 to 100 parts by mass, more preferably from 0.5 to 50 parts by mass and still more preferably from 1 to 30 parts by mass on the basis of 100 parts by mass of the rubber component (A). When the amount of the polymer (B) compounded falls within the above-specified range, the resulting rubber composition can exhibit more excellent processability, mechanical strength and rolling resistance performance.

The polymer (B) may be produced by an emulsion polymerization method, the methods described in WO 2010/027463A and WO 2010/027464A or the like. Among these methods, preferred are an emulsion polymerization method and a solution polymerization method, and more preferred is a solution polymerization method.

(Emulsion Polymerization Method)

The emulsion polymerization method for producing the polymer (B) may be any suitable conventionally known method. For example, a predetermined amount of a farnesene monomer is emulsified and dispersed in the presence of an emulsifying agent, and then the resulting emulsion is subjected to emulsion polymerization using a radical polymerization initiator.

As the emulsifying agent, there may be used, for example, a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization.

Examples of the radical polymerization initiator include persulfates such as ammonium persulfate and potassium persulfate; and organic peroxides and hydrogen peroxide.

In order to adjust a molecular weight of the resulting polymer (B), there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating agent to the reaction system.

Examples of the terminating agent include amine compounds such as isopropyl hydroxylamine, diethyl hydroxylamine and hydroxylamine; quinone-based compounds such as hydroquinone and benzoquinone; and sodium nitrite.

After stopping the polymerization reaction, an antioxidant may be added, if required. Further, after stopping the polymerization reaction, unreacted monomers may be removed from the resulting latex, if required. Thereafter, the resulting polymer (B) is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer (B). The thus recovered polymer is washed with water and dehydrated, and then dried to obtain the polymer (B). Meanwhile, upon coagulating the polymer, the latex may be previously mixed, if required, with an extender oil in the form of an emulsified dispersion to recover the polymer (B) in the form of an oil-extended rubber.

(Solution Polymerization Method)

The solution polymerization method for producing the polymer (B) may be any suitable conventionally known method. For example, a farnesene monomer may be polymerized in a solvent using a Ziegler-based catalyst, a metallocene-based catalyst or an anion-polymerizable active metal, if required, in the presence of a polar compound.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the farnesene polymer as required, and is preferably from 0.01 to 3 parts by mass on the basis of 100 parts by mass of farnesene.

The organic alkali metal compound may be used in the form of an organic alkali metal amide by allowing a secondary amine such as dibutyl amine, dihexyl amine and dibenzyl amine to react therewith.

The polar compound may be used in the anion polymerization for controlling a microstructure of farnesene moieties without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds. The polar compound is preferably used in an amount of from 0.01 to 1,000 mol equivalent on the basis of the organic alkali metal compound.

The temperature used in the above polymerization reaction is usually from −80 to 150° C., preferably from 0 to 100° C. and more preferably from 10 to 90° C. The polymerization method may be either a batch method or a continuous method.

The polymerization reaction may be stopped by adding a terminating agent such as methanol and isopropanol to the reaction system. The resulting polymerization reaction solution may be poured into a poor solvent such as methanol to precipitate the polymer (B). Alternatively, the polymerization reaction solution may be washed with water, and then a solid is separated therefrom and dried to isolate the polymer (B) therefrom.

{Modified Polymer}

The thus obtained polymer (B) may be subjected to modification treatment. Examples of a functional group used in the modification treatment include an amino group, an amide group, an imino group, an imidazole group, a urea group, an alkoxysilyl group, a hydroxyl group, an epoxy group, an ether group, a carboxyl group, a carbonyl group, a mercapto group, an isocyanate group, a nitrile group and an acid anhydride group.

As the method of producing the modified polymer, there may be used, for example, the method in which before adding the terminating agent, a coupling agent such as tin tetrachloride, dibutyl tin chloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying agent such as 4,4'-bis(diethylamino)benzophenone, N-vinyl pyrrolidone, N-methylpyrrolidone, 4-dimethylaminobenzylidene aniline and dimethyl imidazolidinone, or the other modifying agent as described in JP 2011-132298A is added to the polymerization reaction system. Further, the isolated polymer may be grafted with maleic anhydride or the like.

In the modified polymer, the site of the polymer into which the functional group is introduced may be either a chain end or a side chain of the polymer. In addition, these functional groups may be used in combination of any two or more thereof. The modifying agent may be used in an amount of from 0.1 to 10 mol equivalent on the basis of the organic alkali metal compound.

<Carbon Black (C)>

The carbon black (C) used in the rubber composition of the present invention has an average particle size of from 5 to 100 nm. When the average particle size of the carbon black (C) is less than 5 nm, the carbon black tends to exhibit a deteriorated dispersibility in the rubber composition. When the average particle size of the carbon black (C) is more than 100 nm, the resulting rubber composition may fail to exhibit sufficient mechanical strength and hardness.

Examples of the carbon black (C) usable in the present invention include carbon blacks such as furnace black, channel black, thermal black, acetylene black and Ketjen black. Among these carbon blacks, from the viewpoints of a high curing rate and an improved mechanical strength of the rubber composition, preferred is furnace black.

Examples of commercially available furnace black as the carbon black (C) having an average particle size of from 5 to 500 nm include "DIABLACK" available from Mitsubishi Chemical Corp., and "SEAST" available from Tokai Carbon Co., Ltd. Examples of commercially available acetylene black as the carbon black (C) having an average particle size of from 5 to 500 nm include "DENKABLACK" available from Denki Kagaku Kogyo K.K. Examples of commercially available Ketjen black as the carbon black (C) having an average particle size of from 5 to 500 nm include "ECP600JD" available from Lion Corp.

The carbon black (C) may be subjected to an acid treatment with nitric acid, sulfuric acid, hydrochloric acid or a mixed acid thereof or may be subjected to a heat treatment in the presence of air for a surface oxidation treatment thereof, from the viewpoint of improving a wettability or a dispersibility of the carbon black (C) in the rubber component (A) and the polymer (B). In addition, from the viewpoint of improving a mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbonates (such as, for example, $B_4C$ and $B_6C$), boron nitride (such as BN) and other boron compounds.

The average particle size of the carbon black (C) may be controlled by pulverization or the like. In order to pulverize the carbon black (C), there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like.

Meanwhile, the average particle size of the carbon black (C) may be determined by calculating an average value of diameters of carbon black particles measured using a transmission electron microscope.

In the rubber composition of the present invention, the carbon black (C) is compounded in an amount of from 20 to 100 parts by mass on the basis of 100 parts by mass of the rubber component (A). When the amount of the carbon black (C) compounded is more than 100 parts by mass, the resulting rubber composition tends to be deteriorated in processability, dispersibility of the carbon black (C) therein and rolling resistance performance. On the other hand, when the amount of the carbon black (C) compounded is less than 20 parts by mass, the resulting rubber composition tends to be deteriorated in mechanical strength and hardness. The amount of the carbon black (C) compounded in the rubber composition on the basis of 100 parts by mass of the rubber component (A) is preferably 30 parts by mass or more, more preferably 40 parts by mass or more, still more preferably 43 parts by mass or more, and further still more preferably 45 parts by mass or more, and also is preferably 95 parts by mass or less, more preferably 90 parts by mass or less, still more preferably 85 parts by mass or less, and further still more preferably 80 parts by mass or less.

More specifically, the amount of the carbon black (C) compounded in the rubber composition on the basis of 100 parts by mass of the rubber component (A) is preferably from 30 to 100 parts by mass, more preferably from 40 to 90 parts by mass and still more preferably from 45 to 80 parts by mass.

<Optional Components>

In the present invention, for the purposes of enhancing a mechanical strength of the rubber composition, improving various properties such as a heat resistance and a weathering resistance thereof, controlling a hardness thereof, and further improving economy by adding an extender thereto, the rubber composition may also contain a filler other than the carbon black (C), if required.

The filler other than the carbon black (C) may be appropriately selected according to the applications of the obtained rubber composition. For example, as the filler, there may be used one or more fillers selected from the group consisting of organic fillers, and inorganic fillers such as silica, clay, talc, mica, calcium carbonate, magnesium hydroxide, aluminum hydroxide, barium sulfate, titanium oxide, glass fibers, fibrous fillers and glass balloons. Among these fillers, preferred is silica. Specific examples of the silica include dry silica (anhydrous silicic acid) and wet silica (anhydrous silicic acid). Among these silicas, from the viewpoint of enhancing a mechanical strength of the resulting rubber composition, preferred is wet silica. The above filler is preferably compounded in the rubber composition of the present invention in an amount of from 0.1 to 120 parts by mass, more preferably from 5 to 90 parts by mass and still more preferably from 10 to 80 parts by mass on the basis of 100 parts by mass of the rubber component (A). When the amount of the filler compounded falls within the above-specified range, the resulting rubber composition can be furthermore improved in mechanical strength.

Meanwhile, when compounding silica as an optional component, it is preferred that the silica be added together with a silane coupling agent. Examples of the silane coupling agent include bis(3-triethoxysilylpropyl)tetrasulfide, bis(3-triethoxysilylethyl)tetrasulfide, bis(3-trimethoxysilylpropyl)tetrasulfide, bis(3-triethoxysilylpropyl)trisulfide and bis(3-triethoxysilylpropyl)disulfide. Among these silane coupling agents, bis(3-triethoxysilylpropyl)tetrasulfide is preferred because of an excellent processability of the resulting rubber composition. These silane coupling agents may be used alone or in combination of any two or more thereof. The silane coupling agent is preferably compounded in the rubber composition in an amount of from 0.1 to 15 parts by mass on the basis of 100 parts by mass of the rubber component (A).

The rubber composition of the present invention may also contain, if required, a softening agent for the purpose of improving a processability, a flowability or the like of the resulting rubber composition unless the effects of the present invention are adversely influenced. Examples of the softening agent include a process oil such as a silicone oil, an aroma oil, TDAE (treated distilled aromatic extracts), MES (mild extracted solvates), RAE (residual aromatic extracts), a paraffin oil and a naphthene oil; and a liquid polymer such as a low-molecular weight polybutadiene, a low-molecular weight polyisoprene, a low-molecular weight styrene-butadiene copolymer and a low-molecular weight styrene-isoprene copolymer. Meanwhile, the above copolymers may be in the form of either a block copolymer or a random copolymer. The liquid polymer preferably has a weight-average molecular weight of from 2,000 to 80,000 from the viewpoint of a good processability of the resulting rubber composition. The above process oil or liquid polymer as a softening agent is preferably compounded in the rubber composition of the present invention in an amount of less than 50 parts by mass on the basis of 100 parts by mass of the rubber component (A).

The rubber composition of the present invention may also contain, if required, one or more additives selected from the group consisting of an antioxidant, an oxidation inhibitor, a lubricant, a light stabilizer, a scorch retarder, a processing aid, a colorant such as pigments and coloring matters, a flame retardant, an antistatic agent, a delustering agent, an anti-blocking agent, an ultraviolet absorber, a release agent, a foaming agent, an antimicrobial agent, a mildew-proofing agent and a perfume, for the purposes of improving a weathering resistance, a heat resistance, an oxidation resistance or the like of the resulting rubber composition, unless the effects of the present invention are adversely influenced.

Examples of the oxidation inhibitor include hindered phenol-based compounds, phosphorus-based compounds, lactone-based compounds and hydroxyl-based compounds.

Examples of the antioxidant include amine-ketone-based compounds, imidazole-based compounds, amine-based compounds, phenol-based compounds, sulfur-based compounds and phosphorus-based compounds.

The rubber composition of the present invention is preferably used in the from of a crosslinked product produced by adding a crosslinking agent thereto.

Examples of the crosslinking agent include sulfur and sulfur compounds, oxygen, organic peroxides, phenol resins and amino resins, quinone and quinone dioxime derivatives, halogen compounds, aldehyde compounds, alcohol compounds, epoxy compounds, metal halides and organic metal halides, and silane compounds. Among these crosslinking agents, preferred are sulfur and sulfur compounds. These crosslinking agents may be used alone or in combination of any two or more thereof. The crosslinking agent is preferably compounded in the rubber composition in an amount of from 0.1 to 10 parts by mass on the basis of 100 parts by mass of the rubber component (A).

When using sulfur as the crosslinking agent, a vulcanization aid or a vulcanization accelerator is preferably used in combination with the crosslinking agent.

Examples of the vulcanization aid include fatty acids such as stearic acid and metal oxides such as zinc oxide.

Examples of the vulcanization accelerator include guanidine-based compounds, sulfene amide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds and xanthate-based compounds. These vulcanization aids or vulcanization accelerators may be used alone or in combination of any two or more thereof. The vulcanization aid or vulcanization accelerator is preferably compounded in the rubber composition of the present invention in an amount of from 0.1 to 15 parts by mass on the basis of 100 parts by mass of the rubber component (A).

The method for producing the rubber composition of the present invention is not particularly limited, and any suitable method may be used in the present invention as long as the respective components are uniformly mixed with each other.

The method of uniformly mixing the respective components may be carried out using a closed type kneader of a tangential type or a meshing type such a kneader rudder, a Brabender, a Banbury mixer and an internal mixer, a single-screw extruder, a twin-screw extruder, a mixing roll, a roller or the like in a temperature range of usually from 70 to 270° C.

[Tire]

The tire of the present invention is produced by using the rubber composition of the present invention at least in a part thereof, and therefore can exhibit a good mechanical strength and an excellent rolling resistance performance.

EXAMPLES

The present invention will be described in more detail below by referring to the following examples. It should be noted, however, that the following examples are only illustrative and not intended to limit the invention thereto.

Examples 1 to 23 and Comparative Examples 1 to 15

The weight-average molecular weight, melt viscosity, vinyl content and glass transition temperature of the polymer (B), the Mooney viscosity of the rubber composition, the dispersibility of the carbon black (C) in the rubber composition, and the rolling resistance performance, hardness and tensile strength at break of the rubber composition, were measured by the following methods.

(1) Weight-Average Molecular Weight

The weight-average molecular weight (Mw) and the molecular weight distribution (Mw/Mn) of the polymer (B) were measured by GPC (gel permeation chromatography) in terms of a molecular weight of polystyrene as a reference standard substance. The measuring apparatuses and conditions are as follows.

Apparatus: GPC device "GPC8020" available from Tosoh Corp.
Separating column: "TSKgelG4000HXL" available from Tosoh Corp.
Detector: "RI-8020" available from Tosoh Corp.
Eluent: Tetrahydrofuran
Eluent flow rate: 1.0 mL/min
Sample concentration: 5 mg/10 mL
Column temperature: 40° C.

(2) Melt Viscosity

The melt viscosity of the polymer (B) was measured at 38° C. using a Brookfield viscometer available from Brookfield Engineering Labs. Inc.

(3) Vinyl Content

A solution prepared by dissolving 50 mg of the polymer (B) in 1 mL of $CDCl_3$ was subjected to $^1$H-NMR measurement at 400 MHz at a cumulative frequency of 512 times. From the chart obtained by the above measurement, a spectrum portion in the range of from 4.94 to 5.22 ppm was regarded as being a spectrum derived from a vinyl structure, whereas a spectrum portion in the range of from 4.45 to 4.85 ppm was regarded as being a combined spectrum derived from both the vinyl structure and a 1,4-bond, and the vinyl content of the polymer (B) was calculated according to the following formula.

{Vinyl Content}=(integrated value from 4.94 to 5.22 ppm)/2/{(integrated value from 4.94 to 5.22 ppm)/2+[(integrated value from 4.45 to 4.85 ppm)−(integrated value from 4.94 to 5.22 ppm)]/3}

(4) Glass Transition Temperature

Ten milligrams of the polymer (B) were sampled in an aluminum pan, and a thermogram of the sample was measured at temperature rise rate of 10° C./min by differential scanning calorimetry (DSC), and the value at a peak top observed in the DDSC curve was determined as a glass transition temperature of the polymer (B).

(5) Mooney Viscosity

As an index of a processability of the rubber composition, the Mooney viscosity (ML1+4) of the rubber composition before being cured was measured at 100° C. according to JIS K6300. The values of the respective Examples and Comparative Examples appearing in Table 2 are relative values based on 100 as the value of Comparative Example 3. Also, the values of the respective Examples and Comparative Examples appearing in Tables 3 and 4 are relative values based on 100 as the value of Comparative Example 8; and the values of the respective Examples and Comparative Examples appearing in Group 1, Group 2, Group 3, Group 4 and Group 5 in Table 5 are relative values based on 100 as each of the values of Comparative Example 11, Comparative Example 12, Comparative Example 13, Comparative Example 14 and Comparative Example 15, respectively. Meanwhile, the smaller Mooney viscosity value indicates a more excellent processability.

(6) Dispersibility of Carbon Black

The rubber composition was press-molded to prepare a cured sheet (thickness: 2 mm). The thus prepared sheet was cut into a test piece having a section of 2 mm×6 mm, and the section was observed using an optical microscope and visually evaluated by counting the number of aggregated carbon black masses having a size of 20 μm or more on the section. The evaluation ratings are as follows:

[1]: There were present 1 to 7 coagulated carbon black masses.

[2]: There were present 8 to 14 coagulated carbon black masses.

[3]: There were present 15 to 21 coagulated carbon black masses.

[4]: There were present 22 or more coagulated carbon black masses.

Meanwhile, the smaller value indicates a more excellent dispersibility of the carbon black in the rubber composition.

(7) Rolling Resistance Performance

The rubber composition was press-molded to prepare a cured sheet (thickness: 2 mm). The thus prepared sheet was cut into a test piece having a size of 40 mm in length×7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples appearing in Table 2 are relative values based on 100 as the value of Comparative Example 3. Also, the values of the respective Examples and Comparative Examples appearing in Tables 3 and 4 are relative values based on 100 as the value of Comparative Example 8; and the values of the respective Examples and Comparative Examples appearing in Group 1, Group 2, Group 3, Group 4 and Group 5 in Table 5 are relative values based on 100 as each of the values of Comparative Example 11, Comparative Example 12, Comparative Example 13, Comparative Example 14 and Comparative Example 15, respectively. Meanwhile, the smaller value indicates a excellent rolling resistance performance of the rubber composition.

(8) Hardness

According to JIS K6253, the rubber composition was press-molded to prepare a cured sheet (thickness; 2 mm). The hardness of the thus prepared sheet was measured using a type-A hardness tester, and the thus measured hardness was used as an index of a flexibility of the rubber composition. Meanwhile, when the hardness value is less than 50, a tire produced from the rubber composition suffers from large deformation and therefore is deteriorated in steering stability.

(9) Tensile Strength at Break

The rubber composition was press-molded to prepare a cured sheet (thickness; 2 mm). The thus prepared sheet was punched into a dumbbell-shaped test piece according to JIS 3, and the obtained test piece was subjected to measurement of a tensile strength at break thereof using a tensile tester available from Instron Corp. The values of the respective Examples and Comparative Examples appearing in Table 2 are relative values based on 100 as the value of Comparative Example 3. Also, the values of the respective Examples and Comparative Examples appearing in Tables 3 and 4 are relative values based on 100 as the value of Comparative Example 8; and the values of the respective Examples and Comparative Examples appearing in Group 1, Group 2, Group 3, Group 4 and Group 5 in Table 5 are relative values based on 100 as each of the values of Comparative Example 11, Comparative Example 12, Comparative Example 13, Comparative Example 14 and Comparative Example 15, respectively. Meanwhile, the larger value indicates a higher tensile strength at break of the rubber composition.

Production Example 1

Production of Polyfarnesene (B-1)

A pressure reaction vessel previously purged with nitrogen and then dried was charged with 120 g of hexane as a solvent and 1.1 g of n-butyl lithium (in the form of a 17% by mass hexane solution) as an initiator. The contents of the reaction vessel were heated to 50° C., and 210 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-1). Various properties of the thus obtained polyfarnesene (B-1) are shown in Table 1.

Production Example 2

Production of Polyfarnesene (B-2)

A pressure reaction vessel previously purged with nitrogen and then dried was charged with 203 g of hexane as a solvent and 7.7 g of n-butyl lithium (in the form of a 17% by mass hexane solution) as an initiator. The contents of the reaction vessel were heated to 50° C., and 342 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-2). Various properties of the thus obtained polyfarnesene (B-2) are shown in Table 1.

Production Example 3

Production of Polyfarnesene (B-3)

A pressure reaction vessel previously purged with nitrogen and then dried was charged with 274 g of hexane as a solvent and 1.2 g of n-butyl lithium (in the form of a 17% by mass hexane solution) as an initiator. The contents of the reaction vessel were heated to 50° C., and 272 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-3). Various properties of the thus obtained polyfarnesene (B-3) are shown in Table 1.

Production Example 4

Production of Polyfarnesene (B-4)

A pressure reaction vessel previously purged with nitrogen and then dried was charged with 313 g of hexane as a solvent and 0.7 g of n-butyl lithium (in the form of a 17% by mass hexane solution) as an initiator. The contents of the reaction vessel were heated to 50° C., and 226 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-4). Various properties of the thus obtained polyfarnesene (B-4) are shown in Table 1.

Production Example 5

Production of Polyisoprene

The same procedure as in Production Example 1 was repeated except for using isoprene in place of β-farnesene, thereby obtaining a polyisoprene. Various properties of the thus obtained polyisoprene are shown in Table 1.

Production Example 6

Production of Polyfarnesene (B-6)

A pressure reaction vessel previously purged with nitrogen and then dried was charged with 240 g of cyclohexane as a solvent and 1.7 g of n-butyl lithium (in the form of a 17% by mass hexane solution) as an initiator. The contents of the reaction vessel were heated to 50° C., and 0.5 g of N,N,N',N'-tetramethyl ethylenediamine and further 340 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-6). Various properties of the thus obtained polyfarnesene (B-6) are shown in Table 1.

Production Example 7

Production of Polyfarnesene (B-7)

A pressure reaction vessel was charged with 500 g of polyfarnesene produced by the same method as described in Production Example 3, 0.5 g of "NOCRAC 6C" as an antioxidant, and 2.5 g of maleic anhydride. After purging the reaction vessel with nitrogen, the contents of the reaction vessel were heated to 170° C. and reacted at that temperature for 10 h, thereby obtaining a polyfarnesene (B-7). Various properties of the thus obtained polyfarnesene (B-7) are shown in Table 1.

Production Example 8

Production of Polyfarnesene (B-8)

A pressure reaction vessel previously purged with nitrogen and then dried was charged with 241 g of cyclohexane as a solvent and 28.3 g of sec-butyl lithium (in the form of a 10.5% by mass cyclohexane solution) as an initiator. The contents of the reaction vessel were heated to 50° C., and then 342 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-8). Various properties of the thus obtained polyfarnesene (B-8) are shown in Table 1.

C-3: "SEAST TA" available from Tokai Carbon Co., Ltd.; average particle size: 120 nm
C-4: "DIABLACK I" available from Mitsubishi Chemical Corp.; average particle size: 20 nm
C-5: "SEAST V" available from Tokai Carbon Co., Ltd.; average particle size: 60 nm
Optional Components
Polyisoprene: Polyisoprene produced in Production Example 5
TDAE: "VivaTec500" available from H & R Corp.
Resin: "ESCOREZ 1102" available from Exxon Mobil Corp.
Stearic Acid: "LUNAC S-20" available from Kao Corp.
Zinc Oxide Zinc oxide available from Sakai Chemical Industry Co., Ltd.
Antioxidant (1): "NOCRAC 6C" available from Ouchi Shinko Chemical Industrial Co., Ltd.
Antioxidant (2): "ANTAGE RD" available from Kawaguchi Chemical Industry Co., Ltd.
Wax: "SUNTIGHT S" available from Seiko Chemical Co., Ltd.
Sulfur: Sulfur fine powder 200 mesh available from Tsurumi Chemical Industry Co., Ltd.
Vulcanization accelerator: "NOCCELER NS" available from Ouchi Shinko Chemical Industrial Co., Ltd.

TABLE 1

| | Polymer | Weight-average molecular weight ($\times 10^3$) | Molecular weight distribution Mw/Mn | Vinyl content (mass %) | Glass transition temperature (° C.) | Melt viscosity (at 38° C.) (Pa · s) |
|---|---|---|---|---|---|---|
| Production Example 1 | Polyfarnesene (B-1) | 90 | 1.2 | 7 | −73 | 24 |
| Production Example 2 | Polyfarnesene (B-2) | 30 | 1.2 | 8 | −73 | 4 |
| Production Example 3 | Polyfarnesene (B-3) | 140 | 1.2 | 7 | −73 | 69 |
| Production Example 4 | Polyfarnesene (B-4) | 430 | 1.5 | 7 | −73 | 2200 |
| Production Example 5 | Polyisoprene | 60 | 1.1 | — | — | 480 |
| Production Example 6 | Polyfarnesene (B-6) | 100 | 1.1 | 50 | −66 | 62 |
| Production Example 7 | Polyfarnesene (B-7) | 140 | 1.2 | 7 | −71 | 90 |
| Production Example 8 | Polyfarnesene (B-8) | 10 | 1.1 | 8 | −73 | 0.9 |

The respective components including the natural rubber (A), the polymer (B), the carbon black (C) or the like used in the following Examples and Comparative Examples are as follows.
Natural Rubber:
  SMR20 (natural rubber from Malaysia)
  STR20 (natural rubber from Thailand)
Styrene-Butadiene Rubber:
  "JSR1500" available from JSR Corp.; weight-average molecular weight: 450,000; styrene content: 23.5% by weight (produced by emulsion polymerization method)
Butadiene Rubber:
  "BR-01" available from JSR Corp.
Polymer (B):
  Polyfarnesenes (B-1) to (B-4) and (B-6) to (B-8) produced above in Production Examples 1 to 4 and 6 to 8
Carbon Black (C):
  C-1: "DIABLACK H" available from Mitsubishi Chemical Corp.; average particle size: 30 nm
  C-2: "DIABLACK E" available from Mitsubishi Chemical Corp.; average particle size: 50 nm The rubber component (A), polymer (B), carbon black (C), stearic acid, zinc oxide and antioxidant(s) were charged at such a compounding ratio (part(s) by mass) as shown in Tables 2 to 5 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the above method.

In addition, the resulting rubber composition was press-molded (at 145° C. for 20 min) while being cured to prepare a sheet (thickness: 2 mm). The thus prepared sheet was evaluated for a dispersibility of carbon black therein, a rolling resistance performance, a hardness and a tensile strength at break by the above methods. The results are shown in Tables 2 to 5.

TABLE 2

|  | Examples | | | | | Comparative Examples | | |
|---|---|---|---|---|---|---|---|---|
|  | 1 | 2 | 3 | 4 | 5 | 1 | 2 | 3 |
| Compounding ratio (part(s) by mass) | | | | | | | | |
| Component (A) | | | | | | | | |
| Natural rubber (SMR20) | 100 | 100 | 100 | 100 | 100 | 100 | 100 | 100 |
| Styrene-butadiene rubber | | | | | | | | |
| Butadiene rubber | | | | | | | | |
| Component (B) | | | | | | | | |
| Polyfarnesene (B-1) | 10 | | | | 10 | 10 | | |
| Polyfarnesene (B-2) | | 10 | | | | | | |
| Polyfarnesene (B-3) | | | 10 | | | | | |
| Polyfarnesene (B-4) | | | | 10 | | | | |
| Polyfarnesene (B-6) | | | | | | | | |
| Maleic-modified polyfarnesene (B-7) | | | | | | | | |
| Polyfarnesene (B-8) | | | | | | | | |
| TDAE | | | | | | | | |
| Resin: "ESCOREZ 1102" | | | | | | | | |
| Polyisoprene | | | | | | | | 10 |
| Component (C) | | | | | | | | |
| Carbon black (C-1) | 50 | 50 | 50 | 50 | | | 50 | 50 |
| Carbon black (C-2) | | | | | 50 | | | |
| Carbon black (C-3) | | | | | | 50 | | |
| Carbon black (C-4) | | | | | | | | |
| Carbon black (C-5) | | | | | | | | |
| Optional Components | | | | | | | | |
| Stearic acid | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 |
| Antioxidant (2) | | | | | | | | |
| Wax | | | | | | | | |
| Sulfur | 1.5 | 1.5 | 1.5 | 1.5 | 1.5 | 1.5 | 1.5 | 1.5 |
| Vulcanization accelerator | 1 | 1 | 1 | 1 | 1 | 1 | 1 | 1 |
| Properties | | | | | | | | |
| Mooney viscosity (relative value) | 76 | 75 | 76 | 84 | 63 | 56 | 80 | 100 |
| Dispersibility of carbon black | 1 | 1 | 2 | 2 | 1 | 1 | 3 | 3 |
| Rolling resistance performance (at 60° C.; tanδ) (relative value) | 69 | 82 | 69 | 81 | 60 | 55 | 95 | 100 |
| Hardness (type A) | 58 | 56 | 59 | 61 | 56 | 48 | 60 | 64 |
| Tensile strength at break (relative value) | 92 | 95 | 92 | 94 | 82 | 79 | 100 | 100 |

The rubber compositions obtained in Examples 1 to 5 were prevented from being deteriorated in mechanical strength and hardness, and enhanced in dispersibility of carbon black therein. In addition, the rubber compositions obtained in Examples 1 to 3 exhibited a low Mooney viscosity and a good processability. Further, the rubber compositions obtained in Examples 1 and 3 exhibited especially a low rolling resistance and therefore could be suitably used as a rubber composition for tires.

TABLE 3

|  | Examples | | | | | | | | | Comparative Examples | | | | |
|---|---|---|---|---|---|---|---|---|---|---|---|---|---|---|
|  | 6 | 7 | 8 | 9 | 10 | 11 | 12 | 13 | 14 | 4 | 5 | 6 | 7 | 8 |
| Compounding ratio (part(s) by mass) | | | | | | | | | | | | | | |
| Component (A) | | | | | | | | | | | | | | |
| Natural rubber (STR20) | 100 | 100 | 100 | 100 | 100 | 100 | 100 | 100 | 100 | 100 | 100 | 100 | 100 | 100 |
| Styrene-butadiene rubber | | | | | | | | | | | | | | |
| Butadiene rubber | | | | | | | | | | | | | | |
| Component (B) | | | | | | | | | | | | | | |
| Polyfarnesene (B-1) | | | | | | | | | | | | | | |
| Polyfarnesene (B-2) | | | | | | | | | | | | | | |
| Polyfarnesene (B-3) | | | 1 | 3 | 5 | 7 | 10 | 20 | | 10 | 10 | | | |
| Polyfarnesene (B-4) | | | | | | | | | | | | | | |

TABLE 3-continued

|  | Examples | | | | | | | | | Comparative Examples | | | | |
| --- | --- | --- | --- | --- | --- | --- | --- | --- | --- | --- | --- | --- | --- | --- |
|  | 6 | 7 | 8 | 9 | 10 | 11 | 12 | 13 | 14 | 4 | 5 | 6 | 7 | 8 |
| Polyfarnesene (B-6) | 10 | | | | | | | | | | | | | |
| Maleic anhydride-modified polyfarnesene (B-7) | | 10 | | | | | | | | | | | | |
| Polyfarnesene (B-8) | | | | | | | | | | | | | | |
| TDAE | | | | | | | | | | | | | | |
| Resin: "ESCOREZ 1102" | | | | | | | | | | | | | | |
| Polyisoprene | | | | | | | | | | 1 | 5 | 10 | | |
| Component (C) | | | | | | | | | | | | | | |
| Carbon black (C-1) | 50 | 50 | 50 | 50 | 50 | 50 | 50 | 50 | 30 | 15 | 50 | 50 | 50 | 50 |
| Carbon black (C-2) | | | | | | | | | | | | | | |
| Carbon black (C-3) | | | | | | | | | | | | | | |
| Carbon black (C-4) | | | | | | | | | | | | | | |
| Carbon black (C-5) | | | | | | | | | | | | | | |
| Optional Components | | | | | | | | | | | | | | |
| Stearic acid | 2 | 2 | 2 | 2 | 2 | 2 | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 | 1 | 1 | 1 | 1 | 1 | 1 |
| Antioxidant (2) | | | | | | | | | | | | | | |
| Wax | | | | | | | | | | | | | | |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator | 1 | 1 | 1 | 1 | 1 | 1 | 1 | 1 | 1 | 1 | 1 | 1 | 1 | 1 |
| Properties | | | | | | | | | | | | | | |
| Mooney viscosity (relative value) | 74 | 80 | 97 | 93 | 88 | 85 | 77 | 57 | 58 | 40 | 100 | 92 | 81 | 100 |
| Dispersibility of carbon black | 1 | 1 | 2 | 1 | 1 | 1 | 1 | 1 | 1 | 1 | 3 | 3 | 3 | 3 |
| Rolling resistance performance (at 60° C.; tanδ) (relative value) | 89 | 97 | 101 | 99 | 94 | 87 | 80 | 95 | 53 | 34 | 104 | 105 | 109 | 100 |
| Hardness (type A) | 60 | 61 | 64 | 65 | 63 | 63 | 59 | 53 | 50 | 41 | 65 | 63 | 59 | 66 |
| Tensile strength at break (relative value) | 92 | 90 | 99 | 95 | 96 | 92 | 91 | 84 | 99 | 93 | 98 | 98 | 93 | 100 |

TABLE 4

|  | Examples | | Comparative Examples | |
| --- | --- | --- | --- | --- |
|  | 15 | 16 | 9 | 10 |
| Compounding ratio (part(s) by mass) | | | | |
| Component (A) | | | | |
| Natural rubber (STR20) | 100 | 100 | 100 | 100 |
| Styrene-butadiene rubber | | | | |
| Butadiene rubber | | | | |
| Component (B) | | | | |
| Polyfarnesene (B-1) | | | | |
| Polyfarnesene (B-2) | | | | |
| Polyfarnesene (B-3) | 30 | 50 | | |
| Polyfarnesene (B-4) | | | | |
| Polyfarnesene (B-6) | | | | |
| Maleic acid-modified polyfarnesene (B-7) | | | | |
| Polyfarnesene (B-8) | | | | |
| TDAE | | | 30 | 50 |
| Resin: "ESCOREZ 1102" | | | | |
| Polyisoprene | | | | |
| Component (C) | | | | |
| Carbon black (C-1) | 80 | 80 | 80 | 80 |
| Carbon black (C-2) | | | | |
| Carbon black (C-3) | | | | |
| Carbon black (C-4) | | | | |
| Carbon black (C-5) | | | | |
| Optional Components | | | | |
| Stearic acid | 2 | 2 | 2 | 2 |
| Zinc oxide | 3.5 | 3.5 | 3.5 | 3.5 |
| Antioxidant (1) | 1 | 1 | 1 | 1 |
| Antioxidant (2) | | | | |
| Wax | | | | |
| Sulfur | 1.5 | 1.5 | 1.5 | 1.5 |
| Vulcanization accelerator | 1 | 1 | 1 | 1 |
| Properties | | | | |
| Mooney viscosity (relative value) | 71 | 47 | 75 | 49 |
| Dispersibility of carbon black | 2 | 2 | 4 | 4 |
| Rolling resistance performance (at 60° C.; tanδ) (relative value) | 119 | 130 | 128 | 140 |
| Hardness (type A) | 63 | 55 | 62 | 56 |
| Tensile strength at break (relative value) | 67 | 52 | — | — |

TABLE 5

|  | Group 1 | | Group 2 | | Group 3 | | Group 4 | | Group 5 | | | |
| --- | --- | --- | --- | --- | --- | --- | --- | --- | --- | --- | --- | --- |
|  | Ex. 17 | Com. Ex. 11 | Ex. 18 | Com. Ex. 12 | Ex. 19 | Com. Ex. 13 | Ex. 20 | Com. Ex. 14 | Ex. 21 | Ex. 22 | Ex. 23 | Com. Ex. 15 |
| Compounding ratio (part(s) by mass) | | | | | | | | | | | | |
| Component (A) | | | | | | | | | | | | |
| Natural rubber (STR20) | 100 | 100 | 100 | 100 | 50 | 50 | 80 | 80 | 100 | 100 | 100 | 100 |
| Styrene-butadiene rubber | | | | | | | 20 | 20 | | | | |
| Butadiene rubber | | | | | 50 | 50 | | | | | | |
| Component (B) | | | | | | | | | | | | |
| Polyfarnesene (B-1) | | | | | | | | | | | | |
| Polyfarnesene (B-2) | | | | | | | | | | | | |
| Polyfarnesene (B-3) | 2 | | 3 | | 3 | | 5 | | 7 | 7 | 7 | |
| Polyfarnesene (B-4) | | | | | | | | | | | | |
| Polyfarnesene (B-6) | | | | | | | | | | | | |
| Maleic anhydride-modified polyfarnesene (B-7) | | | | | | | | | | | | |
| Polyfarnesene (B-8) | | | | | | | | | | | 3 | |
| TDAE | | | | | | 3 | | | | 3 | | |
| Resin: "ESCOREZ 1102" | | 2 | | | | | | | | | | |
| Polyisoprene | | | | 3 | | | | 5 | 3 | | | 10 |
| Component (C) | | | | | | | | | | | | |
| Carbon black (C-1) | | | | | 45 | 45 | 50 | 50 | 50 | 50 | 50 | 50 |
| Carbon black (C-2) | | | | | | | | | | | | |
| Carbon black (C-3) | | | | | | | | | | | | |
| Carbon black (C-4) | 50 | 50 | | | | | | | | | | |
| Carbon black (C-5) | | | 55 | 55 | | | | | | | | |
| Optional Components | | | | | | | | | | | | |
| Stearic acid | 2 | 2 | 2 | 2 | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 | 3.5 | 3.5 | 3.5 | 3.5 |
| Antioxidant (1) | 1 | 1 | 1 | 1 | 3 | 3 | 1 | 1 | 1 | 1 | 1 | 1 |
| Antioxidant (2) | 0.5 | 0.5 | 1 | 1 | 0.5 | 0.5 | | | | | | |
| Wax | | | | | 2 | 2 | | | | | | |
| Sulfur | 1.6 | 1.6 | 1.5 | 1.5 | 1.2 | 1.2 | 1.5 | 1.5 | 1.5 | 1.5 | 1.5 | 1.5 |
| Vulcanization accelerator | 2 | 2 | 1.2 | 1.2 | 0.75 | 0.75 | 1 | 1 | 1 | 1 | 1 | 1 |
| Properties | | | | | | | | | | | | |
| Mooney viscosity (relative value) | 99 | 100 | 100 | 100 | 97 | 100 | 99 | 100 | 99 | 93 | 92 | 100 |
| Dispersibility of carbon black | 2 | 3 | 1 | 2 | 1 | 3 | 1 | 3 | 1 | 1 | 1 | 3 |
| Rolling resistance performance (at 60° C.; tanδ) (relative value) | 83 | 100 | 90 | 100 | 98 | 100 | 92 | 100 | 82 | 83 | 85 | 100 |
| Hardness (type A) | 71 | 70 | 60 | 60 | 55 | 56 | 61 | 62 | 60 | 60 | 59 | 59 |
| Tensile strength at break (relative value) | 99 | 100 | 102 | 100 | 103 | 100 | 100 | 100 | 99 | 100 | 99 | 100 |

As shown in Table 3, the rubber compositions obtained in Examples 6 to 14 exhibited a good processability owing to a low Mooney viscosity thereof, were enhanced in dispersibility of carbon black therein, and were prevented from being deteriorated in hardness. In addition, these rubber compositions had a low rolling resistance and therefore could be suitably used as a rubber composition for tires.

Among them, from the comparison between Examples 6 and 7, and Comparative Example 7, it was confirmed that the effects of the present invention could be exhibited irrespective of a vinyl content and modification or non-modification of the rubber compositions.

From the comparison between Example 8 and Comparative Example 5, between Example 10 and Comparative Example 6 and between Example 12 and Comparative Example 7, it was confirmed that when using the polymer (B), the resulting rubber compositions were excellent in all of processability, dispersibility of carbon black and rolling resistance performance.

In addition, from the comparison between Example 14 and Comparative Example 4, it was confirmed that when adjusting the content of the carbon black (C) to 20 parts by mass or more based on 100 parts by mass of the rubber component (A), the resulting rubber composition was prevented from being deteriorated in hardness and could be suitably used as a composition for tires.

As shown in Table 4, from the comparison between Example 15 and Comparative Example 9 and between Example 16 and Comparative Example 10, it was confirmed that when adjusting the content of the carbon black (C) to 100 parts by mass or less based on 100 parts by mass of the rubber component (A), the resulting rubber compositions were excellent in all of processability, dispersibility of carbon black and rolling resistance performance.

As shown in Table 5, from the comparison between Example 17 and Comparative Example 11 and between Example 18 and Comparative Example 12, it was confirmed that when using the carbon black (C) having an average particle size of from 5 to 100 nm, the resulting rubber compositions exhibited a good processability and were prevented from being deteriorated in hardness and therefore could provide a rubber composition for tires having an excellent rolling resistance performance.

In addition, from the comparison between Example 19 and Comparative Example 13 and between Example 20 and Comparative Example 14, it was confirmed that even when using a mixture containing two or more kinds of natural and synthetic rubbers as the rubber component (A), it was possible to attain the effects of the present invention.

Further, from the comparison between Examples 21 to 23 and Comparative Example 15, it was confirmed that even when using two or more kinds of polymers (B) or using the polymer (B) in combination with the other optional components, it was also possible to attain the effects of the present invention.

Examples 24 to 28 and Comparative Examples 16 to 19

The respective components including the natural rubber (A), the polymer (B), the carbon black (C) or the like used in Examples 24 to 28 and Comparative Examples 16 to 19 are as follows.
Rubber Component (A):
Styrene-butadiene rubber "JSR1500" available from JSR Corp.; weight-average molecular weight: 450,000; styrene content: 23.5% by weight (produced by emulsion polymerization method)
Polymer (B):
Polyfarnesenes (B-9) to (B-12) produced in Production Examples 9 to 12
Carbon Black (C):
  C-1: "DIABLACK H" available from Mitsubishi Chemical Corp.; average particle size: 30 nm
  C-2: "DIABLACK E" available from Mitsubishi Chemical Corp.; average particle size: 50 nm
  C-3: "SEAST TA" available from Tokai Carbon Co., Ltd.; average particle size: 120 nm
Optional Components
Polyisoprene: Polyisoprene produced in Production Example 13
TDAE: "VivaTec500" available from H & R Corp.
Stearic Acid: "LUNAC S-20" available from Kao Corp.
Zinc Oxide Zinc oxide available from Sakai Chemical Industry Co., Ltd.
Antioxidant (1): "NOCRAC 6C" available from Ouchi Shinko Chemical Industrial Co., Ltd.
Antioxidant (2): "ANTAGE RD" available from Kawaguchi Chemical Industry Co., Ltd.
Sulfur: Sulfur fine powder 200 mesh available from Tsurumi Chemical Industry Co., Ltd.
Vulcanization accelerator (1): "NOCCELER CZ-G" available from Ouchi Shinko Chemical Industrial Co., Ltd.
Vulcanization accelerator (2): "NOCCELER D" available from Ouchi Shinko Chemical Industrial Co., Ltd.

Production Example 9

Production of Polyfarnesene (B-9)

A pressure reaction vessel previously purged with nitrogen and then dried was charged with 120 g of hexane and 1.1 g of n-butyl lithium (in the form of a 17% by mass hexane solution). The contents of the reaction vessel were heated to 50° C., and 210 g of β-farnesene were added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyfarnesene (B-9) having properties shown in Table 6.

Production Example 10

Production of Polyfarnesene (B-10)

A pressure reaction vessel previously purged with nitrogen and then dried was charged with 241 g of cyclohexane and 28.3 g of sec-butyl lithium (in the form of a 10.5% by mass cyclohexane solution). The contents of the reaction vessel were heated to 50° C., and 342 g of β-farnesene were added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyfarnesene (B-10) having properties shown in Table 6.

Production Example 11

Production of Polyfarnesene (B-11)

A pressure reaction vessel previously purged with nitrogen and then dried was charged with 274 g of hexane and 1.2 g of n-butyl lithium (in the form of a 17% by mass hexane solution). The contents of the reaction vessel were heated to 50° C., and 272 g of β-farnesene were added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyfarnesene (B-11) having properties shown in Table 6.

Production Example 12

Production of Polyfarnesene (B-12)

A pressure reaction vessel previously purged with nitrogen and then dried was charged with 313 g of hexane and 0.7 g of n-butyl lithium (in the form of a 17% by mass cyclohexane solution). The contents of the reaction vessel were heated to 50° C., and 226 g of β-farnesene were added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyfarnesene (B-12) having properties shown in Table 6.

Production Example 13

Production of Polyisoprene

A pressure reaction vessel previously purged with nitrogen and then dried was charged with 600 g of hexane and 44.9 g of n-butyl lithium (in the form of a 17% by mass hexane solution). The contents of the reaction vessel were heated to 70° C., and then 2050 g of isoprene were added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining polyisoprene having properties shown in Table 6.

The weight-average molecular weight and melt viscosity of each of the polymer (B) and polyisoprene were measured by the following methods.

(Method of Measuring Weight-Average Molecular Weight)

The weight-average molecular weight (Mw) and the molecular weight distribution (Mw/Mn) of each of the polymer (B) and polyisoprene were measured by GPC (gel permeation chromatography) in terms of a molecular weight of polystyrene as a reference standard substance. The measuring apparatuses and conditions are as follows.

Apparatus: GPC device "GPC8020" available from Tosoh Corp.
Separating column: "TSKgelG4000HXL" available from Tosoh Corp.
Detector: "RI-8020" available from Tosoh Corp.
Eluent: Tetrahydrofuran
Eluent flow rate: 1.0 mL/min
Sample concentration: 5 mg/10 mL
Column temperature: 40° C.

(Method of Measuring Melt Viscosity)

The melt viscosity of the polymer (B) was measured at 38° C. using a Brookfield viscometer available from Brookfield Engineering Labs. Inc.

TABLE 6

| | Polymer | Weight-average molecular weight ($\times 10^3$) | Molecular weight distribution Mw/Mn | Melt viscosity (at 38° C.) (Pa · s) |
|---|---|---|---|---|
| Production Example 9 | Polyfarnesene (B-9) | 90 | 1.2 | 24 |
| Production Example 10 | Polyfarnesene (B-10) | 10 | 1.1 | 0.9 |
| Production Example 11 | Polyfarnesene (B-11) | 140 | 1.2 | 69 |
| Production Example 12 | Polyfarnesene (B-12) | 430 | 1.5 | 2200 |
| Production Example 13 | Polyisoprene | 32 | 1.1 | 74 |

The rubber component (A), polymer (B), polyisoprene, carbon black (C), TDAE, stearic acid, zinc oxide and antioxidants were charged at such a compounding ratio (part(s) by mass) as shown in Table 7 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerators thereto, the contents of the mixing roll were kneaded at 60° C. for 6 min, thereby obtaining a rubber composition. The Mooney viscosity of the thus obtained rubber composition was measured by the below-mentioned method.

In addition, the resulting rubber composition was press-molded (at 145° C. for 20 min) to prepare a sheet (thickness: 2 mm). The thus prepared sheet was evaluated for a dispersibility of carbon black therein, a rolling resistance performance, a hardness, a tensile elongation at break and a tensile strength at break by the below-mentioned methods. The results are shown in Table 7.

Meanwhile, the methods of evaluating the Mooney viscosity of the rubber composition and the dispersibility of the carbon black in the rubber composition, and the methods of measuring the rolling resistance performance, hardness, tensile elongation at break and tensile strength at break of the rubber composition, are as follows.

(1) Mooney Viscosity

As an index of a processability of the rubber composition, the Mooney viscosity (ML1+4) of the rubber composition before being cured was measured at 100° C. according to JIS K6300. The values of the respective Examples and Comparative Examples appearing in Table 7 are relative values based on 100 as the value of Comparative Example 19. Meanwhile, the smaller Mooney viscosity value indicates a more excellent processability.

(2) Dispersibility of Carbon Black

The sheet obtained from the rubber composition produced in the respective Examples and Comparative Examples was cut into a test piece having a section of 2 mm×6 mm, and the section was observed using an optical microscope and visually evaluated by counting the number of coagulated carbon black masses having a size of 20 μm or more on the section. The evaluation ratings are as follows:

[1]: There were present 1 to 3 coagulated carbon black masses.
[2]: There were present 4 to 6 coagulated carbon black masses.
[3]: There were present 7 to 9 coagulated carbon black masses.
[4]: There were present 10 or more coagulated carbon black masses.

The smaller value indicates a more excellent dispersibility of carbon black in the rubber composition.

(3) Rolling Resistance Performance

The sheet obtained from the rubber composition produced in the respective Examples and Comparative Examples was cut into a test piece having a size of 40 mm in length×7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples are relative values based on 100 as the value of Comparative Example 19. Meanwhile, the smaller value indicates a higher rolling resistance performance of the rubber composition.

(4) Hardness

According to JIS K6253, the hardness of the sheet obtained from the rubber composition produced in the respective Examples and Comparative Examples was measured using a type-A hardness tester, and the thus measured hardness was used as an index of a flexibility of the rubber composition. Meanwhile, when the hardness value is less than 50, a tire produced from the rubber composition suffers from large deformation and therefore is deteriorated in steering stability.

(5) Tensile Elongation at Break

The sheet obtained from the rubber composition produced in the respective Examples and Comparative Examples was punched into a dumbbell-shaped test piece according to JIS 3, and the obtained test piece was subjected to measurement of a tensile elongation at break thereof using a tensile tester available from Instron Corp. The values of the respective Examples and Comparative Examples are relative values based on 100 as the value of Comparative Example 19. Meanwhile, the larger value indicates a higher tensile elongation at break of the rubber composition.

(6) Tensile Strength at Break

The sheet obtained from the rubber composition produced in the respective Examples and Comparative Examples was punched into a dumbbell-shaped test piece according to JIS 3, and the obtained test piece was subjected to measurement of a tensile strength at break thereof using a tensile tester available from Instron Corp. The values of the respective Examples and Comparative Examples are relative values based on 100 as the value of Comparative Example 19. Meanwhile, the larger value indicates a higher tensile strength at break of the rubber composition.

TABLE 7

|  | Examples | | | | | Comparative Examples | | | |
| --- | --- | --- | --- | --- | --- | --- | --- | --- | --- |
|  | 24 | 25 | 26 | 27 | 28 | 16 | 17 | 18 | 19 |
| Compounding ratio (part(s) by mass) | | | | | | | | | |
| Component (A) | | | | | | | | | |
| Styrene-butadiene rubber | 100 | 100 | 100 | 100 | 100 | 100 | 100 | 100 | 100 |
| Component (B) | | | | | | | | | |
| Polyfarnesene (B-9) | 10 | | | | 10 | | 10 | | |
| Polyfarnesene (B-10) | | 10 | | | | | | | |
| Polyfarnesene (B-11) | | | 10 | | | | | | |
| Polyfarnesene (B-12) | | | | 10 | | | | | |
| Component (C) | | | | | | | | | |
| Carbon black (C-1) | 50 | 50 | 50 | 50 | | 50 | | 50 | 50 |
| Carbon black (C-2) | | | | | 50 | | | | |
| Carbon black (C-3) | | | | | | | 50 | | |
| Optional Components | | | | | | | | | |
| Polyisoprene | | | | | | 10 | | | |
| TDAE | | | | | | | | 10 | |
| Stearic acid | 1 | 1 | 1 | 1 | 1 | 1 | 1 | 1 | 1 |
| Zinc oxide | 3.5 | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 | 1 |
| Antioxidant (2) | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 |
| Vulcanization accelerator (1) | 1 | 1 | 1 | 1 | 1 | 1 | 1 | 1 | 1 |
| Vulcanization accelerator (2) | 0.5 | 0.5 | 0.5 | 0.5 | 0.5 | 0.5 | 0.5 | 0.5 | 0.5 |
| Properties | | | | | | | | | |
| Mooney viscosity (relative value) | 67 | 63 | 67 | 74 | 55 | 67 | 50 | 70 | 100 |
| Dispersibility of carbon black | 1 | 2 | 2 | 2 | 1 | 3 | 2 | 4 | 3 |
| Rolling resistance performance (at 60° C.; tanδ) (relative value) | 98 | 107 | 98 | 100 | 85 | 104 | 80 | 111 | 100 |
| Hardness (type A) | 59 | 56 | 59 | 61 | 55 | 59 | 48 | 60 | 66 |
| Tensile elongation at break (relative value) | 117 | 138 | 115 | 115 | 110 | 121 | 115 | 127 | 100 |
| Tensile strength at break (relative value) | 91 | 97 | 92 | 93 | 80 | 93 | 75 | 94 | 100 |

The rubber compositions obtained in Examples 24 to 28 exhibited a low Mooney viscosity and a good processability. In addition, the rubber compositions obtained in Examples 24. 26 and 28 were enhanced in dispersibility of carbon black therein, and exhibited a low rolling resistance. In particular, the rubber compositions obtained in Examples 24 and 26 were prevented from being deteriorated in mechanical strength and hardness, and therefore could be suitably used as a rubber composition for tires.

The invention claimed is:

1. A rubber composition, comprising:
 (A) at least one rubber component selected from the group consisting of a synthetic rubber and a natural rubber;
 (B) a polymer of farnesene; and
 (C) carbon black having an average particle size of from 5 to 100 nm,
 wherein a content of the polymer (B) in the rubber composition is from 1 to 30 parts by mass on the basis of 100 parts by mass of the rubber component (A), and wherein a content of the carbon black (C) in the rubber composition is from 20 to 100 parts by mass on the basis of 100 parts by mass of the rubber component (A).

2. The rubber composition according to claim 1, wherein the polymer (B) is a homopolymer of β-farnesene.

3. The rubber composition according to claim 1, wherein the polymer (B) has a melt viscosity of from 0.1 to 3,000 Pa·s as measured at 38° C.

4. The rubber composition according to claim 1, wherein the polymer (B) has a weight-average molecular weight of from 25,000 to 500,000.

5. The rubber composition according to claim 1, wherein the at least one synthetic rubber is present and is at least one rubber selected from the group consisting of a styrene-butadiene rubber, a butadiene rubber, and an isoprene rubber.

6. The rubber composition according to claim 5, wherein the at least one synthetic resin comprises the styrene-butadiene rubber and the styrene-butadiene rubber has a weight-average molecular weight of from 100,000 to 2,500,000.

7. The rubber composition according to claim 5, wherein the at least one synthetic rubber comprises the styrene-butadiene rubber and the styrene-butadiene rubber has a styrene content of from 0.1 to 70% by mass, based on the total mass of the styrene-butadiene rubber.

8. The rubber composition according to claim 5, wherein the at least one synthetic rubber comprises the butadiene rubber and the butadiene rubber has a weight-average molecular weight of from 90,000 to 2,000,000.

9. The rubber composition according to claim 5, wherein the at least one synthetic rubber comprises the butadiene rubber and the butadiene rubber has a vinyl content of 50% by mass or less, based on the total mass of the butadiene rubber.

10. The rubber composition according to claim 1, wherein the polymer (B) has a molecular weight distribution (Mw/Mn) of from 1.0 to 8.0, wherein Mw is the weight-average molecular weight and Mn is the number-average molecular weight.

11. A tire at least partially comprising the rubber composition according to claim 1.

* * * * *